(12) United States Patent
Hyland (10) Patent No.: US 12,072,430 B2
(45) Date of Patent: Aug. 27, 2024

(54) UNDERWATER NAVIGATION

(71) Applicant: CSignum Ltd., Bathgate (GB)

(72) Inventor: Brendan Peter Hyland, Edinburgh (GB)

(73) Assignee: CSignum Ltd., Bathgate (GB)

( * ) Notice: Subject to any disclaimer, the term of this patent is extended or adjusted under 35 U.S.C. 154(b) by 590 days.

(21) Appl. No.: 17/268,079

(22) PCT Filed: Aug. 13, 2019

(86) PCT No.: PCT/EP2019/071716
§ 371 (c)(1),
(2) Date: Feb. 11, 2021

(87) PCT Pub. No.: WO2020/035490
PCT Pub. Date: Feb. 20, 2020

(65) Prior Publication Data
US 2021/0172742 A1    Jun. 10, 2021

(30) Foreign Application Priority Data

Aug. 13, 2018 (GB) ..................... 1813169

(51) Int. Cl.
*G01S 5/02* (2010.01)
*G01C 21/20* (2006.01)
(Continued)

(52) U.S. Cl.
CPC .......... *G01S 5/0295* (2020.05); *G01C 21/203* (2013.01); *H01Q 1/04* (2013.01); *H01Q 7/08* (2013.01); *H04B 5/48* (2024.01)

(58) Field of Classification Search
None
See application file for complete search history.

(56) References Cited

U.S. PATENT DOCUMENTS 4,207,568 A    6/1980 MacLeod
4,878,232 A    10/1989 Fisher
(Continued)

FOREIGN PATENT DOCUMENTS

CN    101943916 A    1/2011
EP    0609694 A2    8/1994
(Continued)

OTHER PUBLICATIONS

International Search Report and Written Opinion for International Application No. PCT/GB2016/000205, mailed Apr. 24, 2017.
(Continued)

*Primary Examiner* — George B Bennett
(74) *Attorney, Agent, or Firm* — Wolf, Greenfield & Sacks, P.C.

(57) ABSTRACT

An underwater navigation system comprising a transmitter (12) for transmitting an electromagnetic signal, a receiver (14) for receiving an electromagnetic signal from the transmitter, and determining means for determining the position of the receiver relative to the transmitter using the received electromagnetic signal. The system determining means may determining the direction of propagation using field strength at three or more receiver locations by determining the direction of propagation by comparison of the field strength received at each antenna, or by comparison of the field strength received at three or more different receiver locations.

14 Claims, 8 Drawing Sheets

(51) Int. Cl.
*H01Q 1/04* (2006.01)
*H01Q 7/08* (2006.01)
*H04B 5/48* (2024.01)

(56) References Cited

U.S. PATENT DOCUMENTS

| | | |
|---|---|---|
| 5,038,406 A | 8/1991 | Titterton et al. |
| 5,303,207 A | 4/1994 | Brady et al. |
| 5,315,561 A | 5/1994 | Grossi |
| 5,513,930 A | 5/1996 | Eathorne |
| 5,579,285 A | 11/1996 | Hubert |
| 5,598,152 A | 1/1997 | Scarzello et al. |
| 5,633,649 A | 5/1997 | Grossi et al. |
| 5,729,134 A | 3/1998 | Lavan, Jr. et al. |
| 5,894,450 A | 4/1999 | Schmidt et al. |
| 5,978,739 A | 11/1999 | Stockton |
| 5,995,806 A | 11/1999 | Tsubouchi et al. |
| 6,034,603 A | 3/2000 | Steeves |
| 6,058,071 A | 5/2000 | Woodall et al. |
| 6,125,080 A | 9/2000 | Sonnenschein et al. |
| 6,130,859 A | 10/2000 | Sonnenschein et al. |
| 6,154,179 A | 11/2000 | Kohno |
| 6,474,254 B1 | 11/2002 | Ambs et al. |
| 6,483,865 B1 | 11/2002 | Beierle |
| 6,512,720 B1 | 1/2003 | Yang |
| 6,522,284 B2 | 2/2003 | Miceli et al. |
| 6,532,192 B1 | 3/2003 | Reid |
| 6,534,985 B2 | 3/2003 | Holladay, III et al. |
| 6,677,757 B2 | 1/2004 | Fine et al. |
| 6,701,252 B2 | 3/2004 | Brown |
| 6,828,782 B2 | 12/2004 | Nagai et al. |
| 6,865,139 B2 | 3/2005 | Hudson |
| 6,873,250 B2 | 3/2005 | Viana et al. |
| 6,933,884 B2 | 8/2005 | Martin et al. |
| 6,941,226 B2 | 9/2005 | Estep |
| 6,967,574 B1 | 11/2005 | Nelson |
| 7,000,560 B2 | 2/2006 | Wingett et al. |
| 7,078,906 B2 | 7/2006 | Nelson |
| 7,139,647 B2 | 11/2006 | Larsen |
| 7,148,691 B2 | 12/2006 | Nelson et al. |
| 7,194,975 B2 | 3/2007 | Potter et al. |
| 7,226,328 B1 | 6/2007 | Puzella et al. |
| 7,233,795 B1 | 6/2007 | Ryden |
| 7,277,010 B2 | 10/2007 | Joao |
| 7,496,002 B2 | 2/2009 | Vosburgh |
| 7,711,322 B2 | 5/2010 | Rhodes et al. |
| 7,796,466 B2 * | 9/2010 | Combee .................. G01V 1/38 367/134 |
| 7,826,794 B2 | 11/2010 | Rhodes et al. |
| 7,853,206 B2 | 12/2010 | Rhodes et al. |
| 7,865,139 B2 | 1/2011 | Dinn et al. |
| 7,873,316 B2 | 1/2011 | Rhodes et al. |
| 7,877,059 B2 | 1/2011 | Rhodes et al. |
| 7,982,679 B2 | 7/2011 | Rhodes et al. |
| 8,045,919 B2 | 10/2011 | Rhodes et al. |
| 8,055,193 B2 | 11/2011 | Rhodes et al. |
| 8,131,213 B2 | 3/2012 | Porter et al. |
| 8,315,560 B2 | 11/2012 | Rhodes et al. |
| 8,326,219 B2 | 12/2012 | Rhodes et al. |
| 8,335,469 B2 | 12/2012 | Rhodes et al. |
| 8,346,164 B2 | 1/2013 | Rhodes et al. |
| 8,358,973 B2 | 1/2013 | Rhodes et al. |
| 8,364,078 B2 | 1/2013 | Rhodes et al. |
| 8,437,224 B2 | 5/2013 | Rhodes et al. |
| 8,515,344 B2 | 8/2013 | Rhodes et al. |
| 8,531,918 B2 | 9/2013 | Rhodes et al. |
| 8,577,288 B2 | 11/2013 | Rhodes et al. |
| 9,037,079 B2 | 5/2015 | Wolfe et al. |
| 9,037,181 B2 | 5/2015 | Keshavarzian |
| 10,270,540 B2 | 4/2019 | Rhodes et al. |
| 10,735,107 B2 | 8/2020 | Rhodes et al. |
| 10,742,331 B2 | 8/2020 | Rhodes et al. |
| 10,945,211 B2 | 3/2021 | Hyland et al. |
| 11,063,674 B2 | 7/2021 | Rhodes et al. |
| 11,075,701 B2 | 7/2021 | Rhodes et al. |
| 11,092,711 B2 * | 8/2021 | Fyffe .................... G01V 1/3852 |
| 11,372,455 B2 * | 6/2022 | Gauthier, Jr. .......... G01C 21/00 |
| 11,549,814 B2 * | 1/2023 | Wilby .................... G01C 21/12 |
| 11,681,041 B2 * | 6/2023 | Brink .................... G05D 1/0692 441/21 |
| 11,750,300 B2 * | 9/2023 | Rhodes .................. H04B 13/02 455/40 |
| 2002/0176323 A1 | 11/2002 | Magine et al. |
| 2002/0176333 A1 | 11/2002 | Lin |
| 2002/0180443 A1 | 12/2002 | Fine et al. |
| 2003/0016130 A1 | 1/2003 | Joao |
| 2003/0230409 A1 | 12/2003 | Guesnon et al. |
| 2004/0009759 A1 | 1/2004 | Mayor et al. |
| 2004/0066313 A1 | 4/2004 | Ong et al. |
| 2004/0266497 A1 | 12/2004 | Reagor et al. |
| 2005/0122231 A1 | 6/2005 | Varaiya et al. |
| 2005/0219950 A1 | 10/2005 | Rowe |
| 2006/0209715 A1 | 9/2006 | Kushalnagar et al. |
| 2006/0286931 A1 | 12/2006 | Rhodes et al. |
| 2007/0077951 A1 | 4/2007 | Manjeshwar et al. |
| 2007/0229237 A1 | 10/2007 | Kates |
| 2008/0049700 A1 | 2/2008 | Shah et al. |
| 2008/0128138 A1 | 6/2008 | Radi |
| 2008/0144442 A1 | 6/2008 | Combee et al. |
| 2008/0192129 A1 | 8/2008 | Walker et al. |
| 2009/0265111 A1 * | 10/2009 | Helwig .................. G01V 3/083 702/7 |
| 2010/0025261 A1 | 2/2010 | Dowling et al. |
| 2010/0027449 A1 | 2/2010 | Kim et al. |
| 2010/0134319 A1 | 6/2010 | Rhodes et al. |
| 2010/0159828 A1 | 6/2010 | Rhodes et al. |
| 2010/0315981 A1 | 12/2010 | Keshavarzian et al. |
| 2011/0291904 A1 * | 12/2011 | Conway .................. H01Q 7/08 343/788 |
| 2011/0299364 A1 | 12/2011 | Rhodes et al. |
| 2014/0051352 A1 | 2/2014 | Wolfe et al. |
| 2014/0065953 A1 | 3/2014 | Rhodes et al. |
| 2014/0174752 A1 | 6/2014 | Sipila et al. |
| 2014/0308896 A1 | 10/2014 | Baret et al. |
| 2015/0085853 A1 | 3/2015 | Smith et al. |
| 2015/0142315 A1 | 5/2015 | Guzzo et al. |
| 2015/0346064 A1 | 12/2015 | Liu et al. |
| 2016/0007293 A1 | 1/2016 | Hyland et al. |
| 2016/0012390 A1 | 1/2016 | Skaaksrud |
| 2016/0055322 A1 | 2/2016 | Thomas |
| 2016/0264223 A1 | 9/2016 | Ferguson et al. |
| 2016/0305797 A1 | 10/2016 | Pietrasik et al. |
| 2017/0180480 A1 | 6/2017 | Yang et al. |
| 2017/0347168 A1 | 11/2017 | Kim et al. |
| 2017/0350615 A1 | 12/2017 | Ashar |
| 2018/0248685 A1 | 8/2018 | O'Brien |
| 2018/0337737 A1 | 11/2018 | Hyland |
| 2019/0253156 A1 | 8/2019 | Rhodes et al. |
| 2019/0334630 A1 | 10/2019 | Rhodes et al. |
| 2019/0373434 A1 | 12/2019 | Lindstrom |
| 2020/0059365 A1 | 2/2020 | Hyland |
| 2020/0350998 A1 | 11/2020 | Rhodes et al. |
| 2020/0350999 A1 | 11/2020 | Rhodes et al. |
| 2021/0115780 A1 | 4/2021 | Hyland |
| 2021/0344429 A1 | 11/2021 | Rhodes et al. |
| 2021/0351849 A1 | 11/2021 | Hyland |
| 2024/0080107 A1 * | 3/2024 | Schill .................... H04B 10/80 |

FOREIGN PATENT DOCUMENTS

| | | | |
|---|---|---|---|
| EP | 2657723 A1 | 10/2013 | |
| GB | 2163029 A | 2/1986 | |
| GB | 2457581 A | 8/2009 | |
| GB | 2459218 A * | 10/2009 | ............. G01S 13/02 |
| GB | 2462543 A * | 2/2010 | ............. G01S 5/02 |
| WO | WO 87/04028 A1 | 7/1987 | |
| WO | WO 94/10629 A1 | 5/1994 | |
| WO | WO 2006/134327 A2 | 12/2006 | |
| WO | WO 2013/068739 A2 | 5/2013 | |
| WO | WO 2014/128512 A1 | 8/2014 | |

(56) References Cited

FOREIGN PATENT DOCUMENTS

| WO | WO 2015/012970 A2 | 1/2015 |
|---|---|---|
| WO | WO 2015/183491 A1 | 12/2015 |

OTHER PUBLICATIONS

International Preliminary Report on Patentability for International Application No. PCT/GB2014/050568 mailed Sep. 3, 2015.
International Preliminary Report on Patentability for International Application No. PCT/GB2016/000205 mailed May 31, 2018.
International Search Report and Written Opinion for International Application No. PCT/GB2014/050568 mailed Jun. 4, 2014.
International Search Report and Written Opinion for International Application No. PCT/EP2018/056466 mailed Aug. 24, 2018.
International Preliminary Report on Patentability for International Application No. PCT/EP2018/056466 mailed Sep. 26, 2019.
International Search Report and Written Opinion for International Application No. PCT/EP2018/061088 mailed Jan. 3, 2019.
International Preliminary Report on Patentability for International Application No. PCT/EP2018/061088 mailed Nov. 14, 2019.
International Preliminary Report on Patentability for International Application No. PCT/EP2019/071724 mailed Nov. 20, 2019.
International Search Report and Written Opinion mailed Feb. 25, 2021 in connection with International Application No. PCT/EP2019/071724.
International Preliminary Report on Patentability for International Application No. PCT/EP2019/071716 mailed Feb. 25, 2021.
Chang et al., An efficient tree-based power saving scheme for wireless sensor networks with mobile sink. IEEE Sensors Journal. Oct. 15, 2016;16(20):7545-57.
International Search Report and Written Opinion mailed Feb. 4, 2020 in connection with International Application No. PCT/EP2019/071716.

\* cited by examiner

UNDERWATER NAVIGATION

RELATED APPLICATIONS

This Application is a national stage filing under 35 U.S.C. § 371 of International Patent Application Serial No. PCT/EP2019/071716, filed Aug. 13, 2019, entitled UNDERWATER NAVIGATION. Foreign priority benefits are claimed under 35 U.S.C. § 119(a)-(d) or 35 U.S.C. § 365(b) of Great Britain application number 1813169.8, filed Aug. 13, 2018. The entire contents of these applications are incorporated herein by reference in their entirety.

The present invention relates to an underwater navigation system. In particular, the invention relates to the use of underwater electromagnetic propagation to determine a receivers position relative to a node or distributed assembly of nodes.

BACKGROUND

Underwater navigation has typically been accomplished using inertial navigation or acoustic nodes. Acoustic systems are degraded by noise and interference from a number of sources. They are also subject to multi-path effects and in some environments are virtually unusable. Inertial navigation systems are complex, bulky, high cost, accumulate inaccuracy over time and require knowledge of an initial reference point.

U.S. Pat. No. 6,865,139 describes a sub-sea navigation system that uses electromagnetic transmission. This has a plurality of antennas located at known positions on a sub-sea structure. Each antenna is electrically coupled and includes a cathodic protection anode. Signals emitted by the antennas are used by a detection means on a sub-sea vehicle to allow the vehicle to navigate relative to the sub-sea structure. The detection means uses a measure of the electric field of the emitted signals in order to determine the position of the vehicle. A problem with the system of U.S. Pat. No. 6,865,139 is that the signals emitted by the electrically coupled antennas are subject to high near field attenuation and the receive antennas have low efficiency. This reduces the range over which position can be determined and limits the applicability of the system. Also, there is little information provided on how exactly the position is determined using the measure of electric field.

U.S. Pat. No. 8,315,560 describes a navigation system which uses electromagnetic transmission with multiple nodes providing transmission signals enabling cross reference of the multiple signals to determine the position of the, for example, a passing AUV. However, this system depends on the AUV being within range of multiple nodes at a given time.

High quality Ins are expensive and unable to accommodate many days of operation without correction. Acoustic repeaters produce a:foot-print˜ that is readily detected and are unable to operate for more than 1-2 years between battery swaps. Passive sonar devices require the use of a sonar which is detectable. Further, passive devices are unable to support 2-way data transmissions.

SUMMARY OF THE INVENTION

According to one aspect of the present invention, there is provided an underwater navigation system comprising: a transmitter for transmitting an electromagnetic signal, a receiver for receiving an electromagnetic signal from the transmitter, and means for determining the position of the receiver relative to the transmitter using the received electromagnetic signal.

In far field electromagnetic propagation, the relationship between the electric and magnetic field is determined by the transmission media˜s characteristic impedance. An electrically coupled antenna launches a predominantly electric field that transitions to the characteristic impedance over an area known as the near field.

Underwater attenuation is largely due to the effect of conduction on the electric field. Since electrically coupled antennas produce a higher E-field component, in the near field the radiated signal experiences higher attenuation. The same performance issues apply to a receive antenna. Magnetic coupled antennas do not suffer from these problems and so are more efficient under water than electrically coupled antennas.

Using an electrically insulated antenna provides further advantages. This is because for a non-insulated electrically coupled antenna, there is a direct conduction path between it and the dissipative water. This leads to dissipation as the signal propagates along the antenna even before the electromagnetic signal is launched. Providing an insulated antenna reduces this effect.

The means for determining the position of the receiver may be operable to determine the distance of the receiver from the transmitter and/or the direction of the receiver relative to the transmitter. These may be determined using signal strength at the receiver and/or the direction of signal propagation at the receiver and/or the time taken for a signal to travel between the transmitter and the receiver.

The field strength may be used to determine proximity based on strength of received signal for a given transmitter power and propagation characteristics. To this end, means are provided for measuring the strength or magnitude of the received signals.

F or most applications calculation of the receivers range to the transmitter can be based on a typical physical model of the underwater environment. This model could be improved by measurement of attenuation using a comparison of signal strength between multiple antennas with known relative positions within the navigating station.

The direction of signal propagation may be determined by alignment of a highly directional antenna or based on comparison of the field strength received by several antennas distributed in space. In the latter case, because of the high attenuation per metre experienced in water, a local loss gradient vector can be established by comparison of field strength measured from the multiple antennas. Attenuation will be measurable within the dimensions of a typical mobile vehicle.

The transmitter and receiver may be operable to simultaneously provide a communication links.

According to another aspect of the present invention, there is provided an underwater navigation system comprising: a transmitter for transmitting an electromagnetic signal, a navigation station having receiving means for receiving a signal from the transmitter, and determining means for determining the position of the station using signals received by the receiving means at three or more different positions.

By using signals received at a plurality of different receiver positions, the position of the navigation station can be determined relative to a single transmitter. This reduces the number of nodes required and allows applications where location of an isolated object is required rather than the distributed objects required by a multiple transmit antenna system.

The receiving means may comprise three or more spatially separated receivers. In this case, the determining means may be operable to determine the position of the station using a signal from each of the receivers. An advantage of this is that the measurements can be taken simultaneously.

The receiving means may include a single antenna. To determine the position of the station, the antenna would be moved to three or more different measurement positions. This could be done either by moving the station or by moving the antenna. In this latter case, the antenna could be provided at the end of a rotating arm. In any case, an inertial navigation system could provide accurate short-term knowledge of the relative position of successive measurements as the vehicle moves through the water. Position relative to the node may then be determined using standard trigonometry.

The means for determining may be operable to determine the directional position of the receiver using the magnitude of the field at the plurality of receiver positions.

The means for determining the position may be operable to determine proximity to the transmitter using the magnitude of the signal received at one or more receiver positions.

The transmitter may include an electrically insulated magnetic coupled antenna for transmitting an electromagnetic signal.

The receiver may include an electrically insulated magnetic coupled antenna for receiving an electromagnetic signal from the transmitter.

According to another aspect of the present invention, there is provided an underwater navigation system comprising: a transmitter for transmitting an electromagnetic signal, a receiver for receiving a signal from the transmitter, and means for determining the position of the receiver using the magnitude of the received signal.

According to yet another aspect of the present invention, there is provided a system for determining underwater electromagnetic signal propagation direction comprising at least one receiver for receiving the electromagnetic signal and determining means for determining the direction of propagation using field strength at three or more receiver locations. Three or more receiver antennas may be provided and the determining means may be operable to determine the direction of propagation by comparison of the field strength received at each antenna.

Alternatively, a single receiver antenna may be provided and the determining means may be operable to determine the direction of propagation by comparison of the field strength received at three or more different receiver locations.

BRIEF DESCRIPTION OF DRAWINGS

Various aspects of the invention will now be described by way of example only and with reference to the accompanying drawings, of which.

Figure 1:
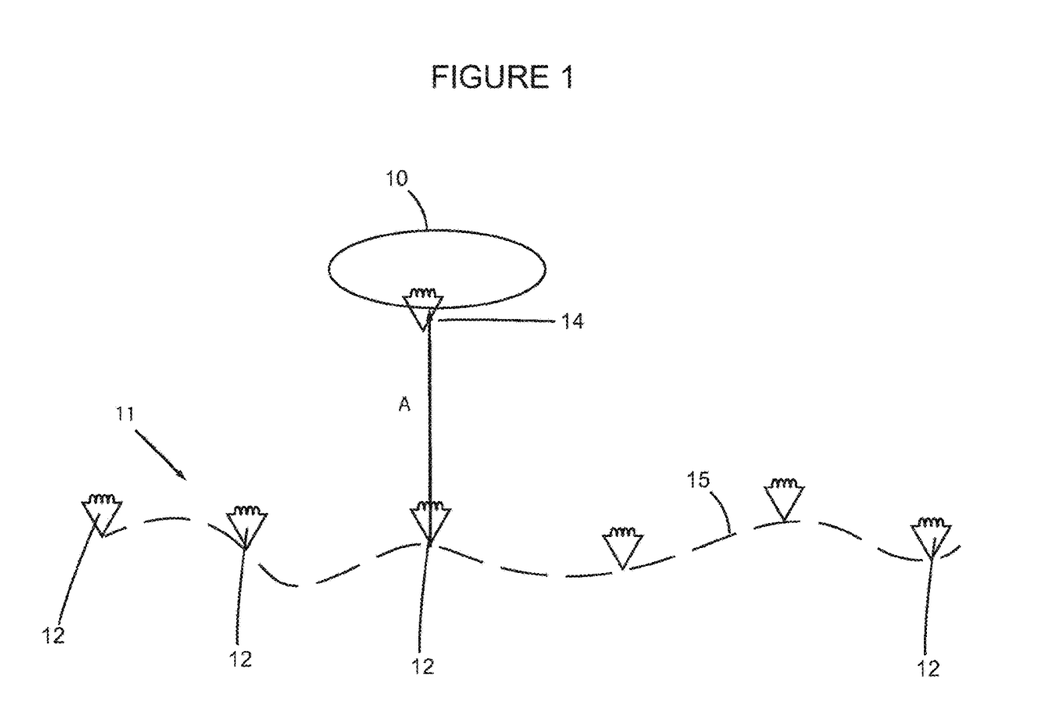
FIG. 1 is a block diagram of an underwater navigation system.

FIG. 1 shows a mobile navigating station 10 that is operable to navigate around an underwater environment using magnetic radiation transmitted between one or more fixed position nodes 12 and at least one receiver 14 carried on the mobile station 10. Due to the short range nature of underwater electromagnetic propagation, if a signal is detectable above a given threshold the receivers 14 position is known to be in close proximity to the transmitting node 12. To allow the navigating station 10 to differentiate between individual sources in a multi-node environment, the transmitting nodes 12 may produce an identifying signal. For example, each transmitter 12 may broadcast on a different frequency. Alternatively, each transmitter 12 may encode some form of identifying modulation.

Figure 2:
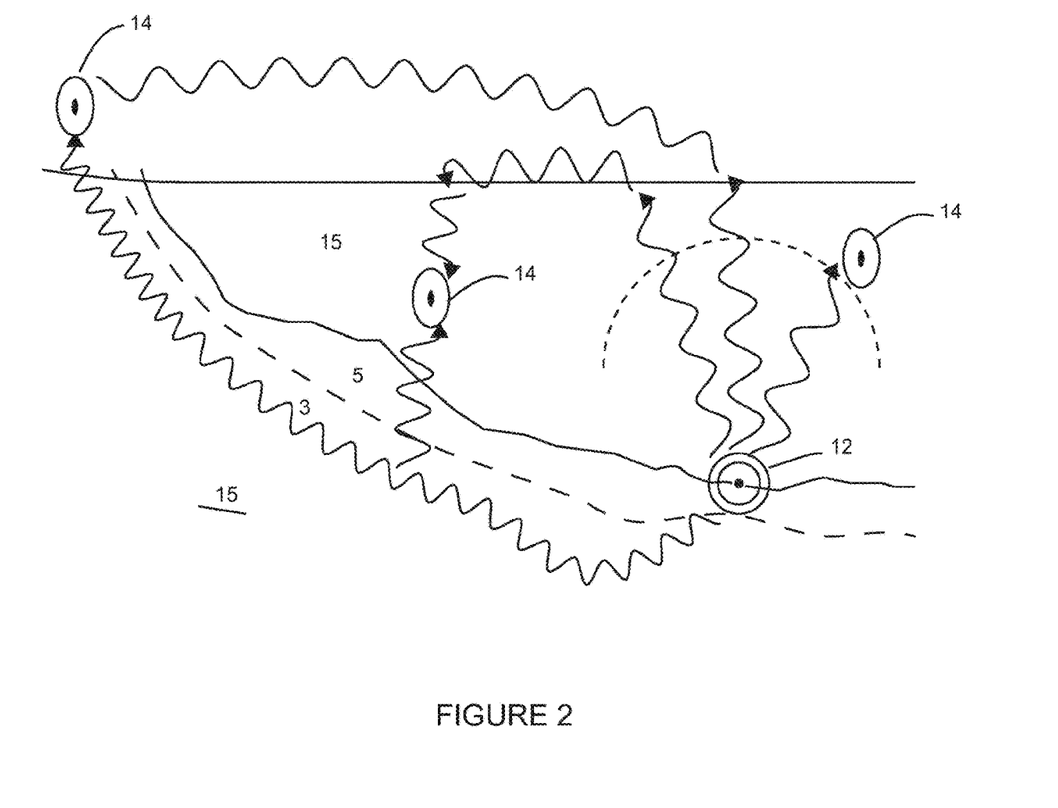
FIG. 2 is a schematic diagram of a section of deployed system according to the present invention.

With reference to FIG. 2, the nodes 12 may be deployed on a seabed 15, which is formed of sedimentary layers 5 and solid rock strata 3. Mobile nodes, which may be transceivers but in this case are receivers 14 can be deployed on divers, AUVs, tethers to the seabed or on land, are operable to receive data from fixed nodes 12. Data transmission can follow paths through water, the water air interface, ground or air to be received by the node 14 deployed, in this case, on land.

Electromagnetic signal transmission by nodes 12 provides a secure, persistent and low-cost and low-power method of providing location, navigation and communications with a water based vehicle, in this case an AUV 10 operating over a wide area within the ocean. In this embodiment, and with reference to FIG. 3, the network 11 of nodes 12 comprises wireless nodes 12 spaced at 20-25 km intervals on the seabed 15 which can be configured to act as 'wireless white lines' 17. AUV 10 is provided with a INS (Inertial Navigation System) integrated within a processor mechanism with a communication unit which uses electromagnetic signal transmission to transmit a wake-up signal to seabed nodes 12. When the AUV 10 passes within 250 m of a node, the node is wakened and then transmits ID and location information. Magnetic field strength data is used to correct the INS within the AUV 10.

Figure 3:
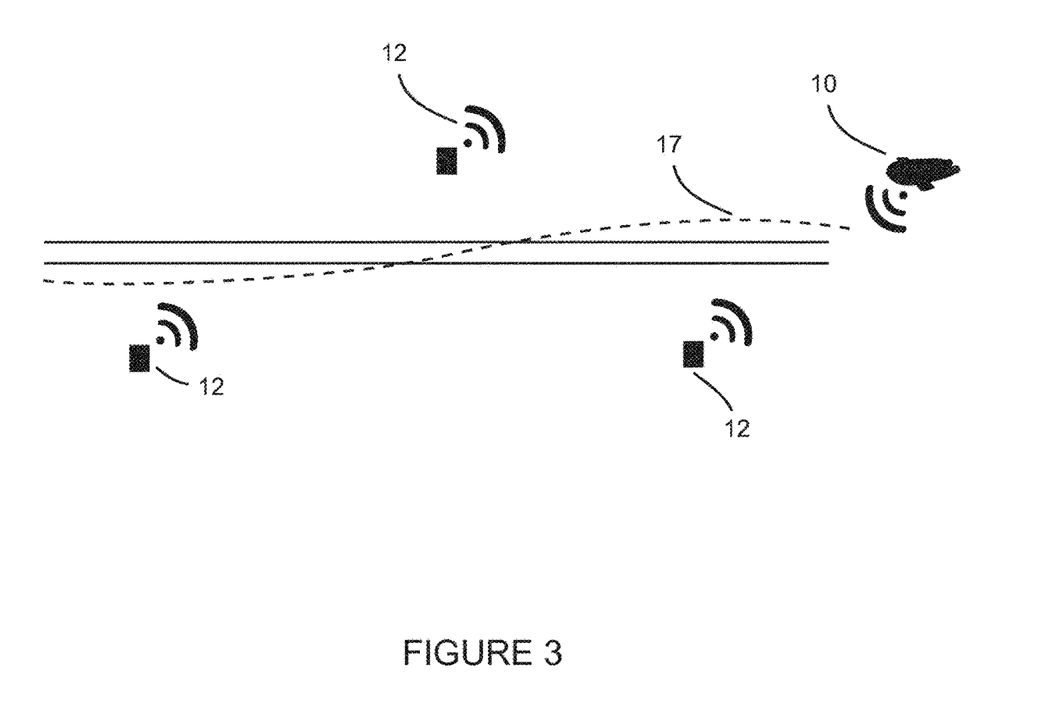
FIG. 3 is a schematic diagram of a section of deployed system according to the present invention.

The node network 11 reduces the cost and complexity of AUV 10 navigation, allowing AUV 10 to act as data mules, interlinking smart wireless nodes 12 in, for example, creating and using Subsea Cloud Computing Networks.

In the event GPS is compromised, and above water navigation techniques are not useable, the node network 11 will provide an independent, reliable and persistent location and navigation system for underwater vehicles and, in littoral waters, for surface vehicles and low flying UAVs.

The underlying principles of operation of the node network 11 and nodes 12 includes low frequency electromagnetic transmission signals which attenuate in seawater at approximately 55 dB/wavelength; thus each node 12 has a transceiver 14 having a low frequency electromagnetic transmission transmitter produces a field that propagates up to 40 m through the water column and up to 250 m across the seabed.

The field strength emitted by the nodes 12 varies in a similar manner to Ordnance Survey contour lines and as a result, the field strength at any point is measurable and can thus be used to identify the location of the node 12 and of the AUV 10.

When AUV 10 cuts through a field emitted by the node 12, the AUV 14 is taking measurements of field strength using receiver within transceiver 14, the location, orientation, speed, and direction of the vehicle can be determined The performance of nodes 12 improves when embedded in the seabed 15 as the seabed presents a path of lower conductivity however, the nodes 12 may also be placed on the surface of the seabed 15. It will be appreciated that a processor 38 within each node 12 may be provided with an algorithmic function to correct the transceiver signal strength for seabed properties.

In use, each node 12 is pre-programmed with a unique identification number and a GPS coordinate set at the time of deployment.

An integrated accelerometer can be provided within node 12 and be used to monitor movement of the node 12 during deployment and may be used to refine the accuracy of the resting location. The integrated accelerometer is also able to be used to determine the orientation of the integrated antenna within node 12 and provide information on the field orientation which is used to refine location information.

Antenna construction and antenna size have a material impact on system performance of the nodes 12. For example, ferrite, loop and squids may be used as the antenna. Ferrite and loop technologies are mature. Ferrite sensors are compact but have a defined orientation. Loop antennas are generally larger than ferrite but are not orientation sensitive and more sensitive. Room temperature Squid is less mature and will require investigation but may prove to be more compact and more sensitive than either.

The seabed conductivity will impact the lateral propagation of magnetic fields. The system will incorporate a standard model used to determine field strength at a distance. The model may be based on a magnetic field modelling tool. The field propagation patterns may optionally be pre-adjusted by survey data providing further information on actual conductivity of the seabed. Seabed conductivity may optionally be refined using sensors incorporated in the node 12 as the seabed is not homogenous and thus transmission distance may be extended or foreshorted from an average. The pre-map system can provide data to account for this or alternatively transmission of signals at two different frequencies can be used to model the seabed materials.

Nodes 12 further incorporate a power source (not shown) in this case, a battery having battery management technology that allows seabed nodes 12 to run in Receive mode at a very low energy level (typically <1 mW). Commercial off the shelf systems can, for example, run for up to 30 years on modest battery packs.

Nodes 12 have a low probability of intercept due to the use of electromagnetic signals for communication. To use nodes 12, they must be activated by the correct frequency. They may optionally be configured to require two or more frequencies configured as a:lock and key˘ to improve security. Tamperproof data erasing techniques may also be incorporated for further security.

The nodes 12 may be deployed by surface vehicle, aerial vehicle or underwater vehicle 10 at a time of choosing˘ possibly many years in advance. Each node 12 may optionally incorporate a wirelessly triggered flotation device to allow recovery.

A navigation INS correction system is integrated with underwater vehicles 10, surface or aerial vehicles to correct navigation during communication with the nodes 12. In an AUV 10, a:drop-in˘module incorporating wireless communications systems. GPS correction information is streamed into the vehicle INS whilst the vehicle 10 is within the vicinity of the node 12.

In use 2-way data communications link is set up whilst the vehicle is within range of the node.

The node transmits its unique ID, and GPS location to the passing vehicle 10. The node can optionally transmit further information to the transiting vehicle, for example node health data, instructions for the vehicle 10. The transiting vehicle 10 can optionally transmit information to the node, for example health data, mission information, software updates.

The node system 11 provides improvement over existing underwater vehicle INS systems by delivering significant extension in the distance AUV 10s can operate before resurfacing for INS correction. This dramatically reduces the cost of accurate navigation for AUV 10s by transferring the investment to infrastructure and provides resilient and reliable fall-back in event GPS unavailable. The network 11 provides persistent, non-deniable, waypoint nodes 20 to correct INSs and is deployable for up to 30 years on a single battery pack which operates in shallow and deep water and is unaffected by turbidity, biofouling, ambient noise which is deployed readily using existing hardware and the navigation system 11 is unaffected by EMP.

Systems nodes can be configured to be recovered using integrated wireless release trigger and deployments so then nodes can be reused. The nodes 10 can be used to
provide a low cost, covert method of monitoring critical infrastructure and a rapid and covert method of providing improved navigation in complex operating environments for AUV 10s, diver, SDV and submarines.

Magnetic field pattern simulations will be incorporated within the nodes of system 11 and these will be used to estimate the field patterns produced by of loop and ferrite transmit antennas in a range of seabed conditions and pre-selected carrier frequencies. Algorithms which provide the accurate location, orientation, direction and speed of a vehicle by matching field strength data against pre-determined field patterns will also be incorporated within the nodes 12 and AUV 10.

A user interface can be used prior to deployment to configure the network 11 and to configure each node 12 prior to deployment and subsequently to update software and to interrogate the network 11.

Room temperature SQUID sensors are suitable for incorporation into the nodes 12 and processor electronics within nodes 12 will be pre-set with system design parameters with variables including system centre frequency, receive sensitivity, transmit power and wake circuit.

Each node 12 is, in this case, a single node incorporating electronics, battery and antenna that is sealed for life and designed for ease of deployment and recovery.

In one embodiment, the system design will, for example, enable navigation correction at 250 m from a node for an AUV 10 travelling at 5 m above the seabed with integrated INS correction.

Seabed conductivity variability leads to reduced operating range and system accuracy and this can be mitigated by local field characterisation using a fly-by AUV 10. In areas of high turbulence or disturbance, the unpredictability of water currents requires nodes 12 to be placed at shorter intervals from one another. The integration of water current sensors in nodes 12 may provide improved information on local conditions to assist with refining vehicle way-point guidance The system 11 has applications in a number of industries including:
- Oil & Gas: using low cost AUV 10s to reduce the cost of asset integrity management;
- Offshore wind, wave tidal: using low cost AUV 10s to reduce the cost of asset integrity management and environmental footprint monitoring;
- Telecoms: using low cost AUV 10s to reduce the cost of monitoring submarine cables;
- Environmental: using low cost AUV 10s to lower the cost of building out wide area sensor networks to provide improved weather, oceanographic and climate change modelling;
- Aquaculture: using low cost AUV 10s to reduce the cost of monitoring remote fish cages and environmental footprint monitoring sensors.

It will be appreciated that the system 11 can improve location accuracy through increased use of environmental monitoring sensors; increase system intelligence through integration with Subsea CI oud Computing Network technology, incorporating Machine Learning; increase security through incorporation of Digital Ledger technology.

A key feature of system 11 is the low cost of navigation nodes 12 and the long battery life. On-board diagnostics can be used to alert fly-by AUV 10s to anticipated problems providing time for replacement nodes 12 to be deployed.

Figure 4:
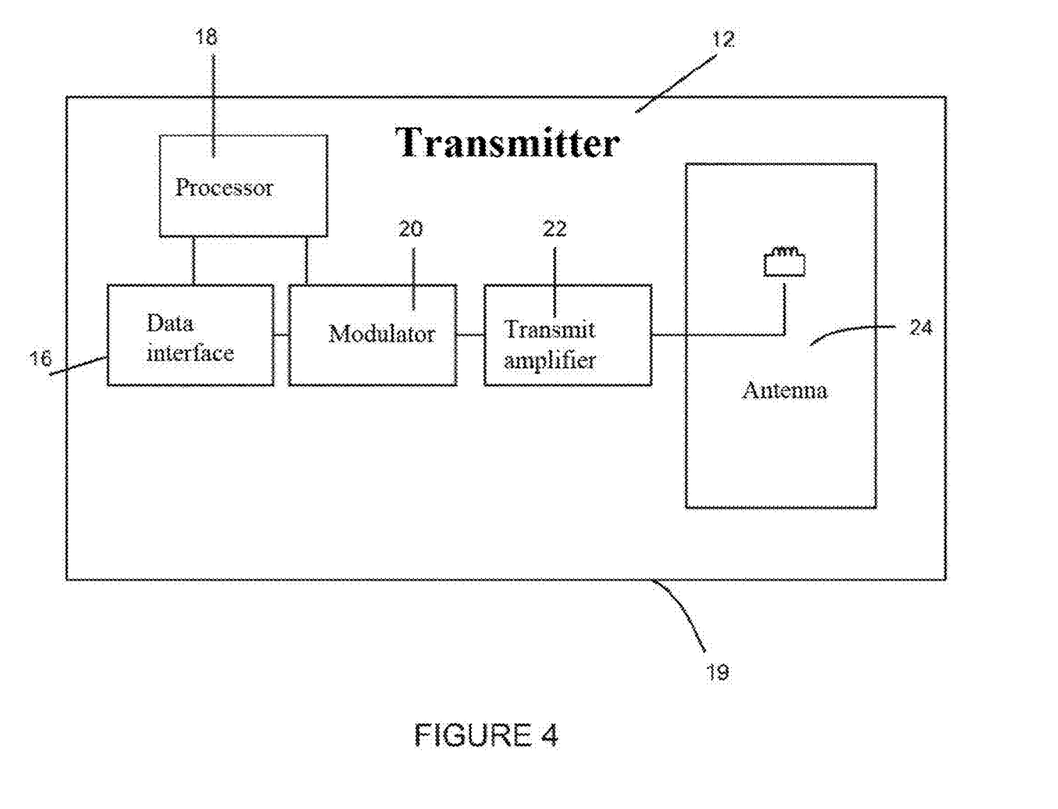
FIG. 4 is a block diagram of an underwater transmitter for use in the underwater navigation system of FIG. 1.

FIG. 4 shows an example of a transmitter for node 12 for use in the mobile station 10 of FIGS. 1, 2 and 3. This has a data interface 16 that is connected to each of a processor 18 and a modulator 20. The modulator 20 is provided to encode data onto carrier wave. At an output of the modulator 20 is a transmit amplifier 22, which is connected to an underwater, electrically insulated magnetic coupled antenna 24. In use, the processor 20 is operable to cause electromagnetic navigation signals to be transmitted at regular intervals or in response to an external signal, for example from the mobile station 10. These magnetic signals can be received and used as a guide or navigational aid by any mobile station 10 in the vicinity.

Figure 5:
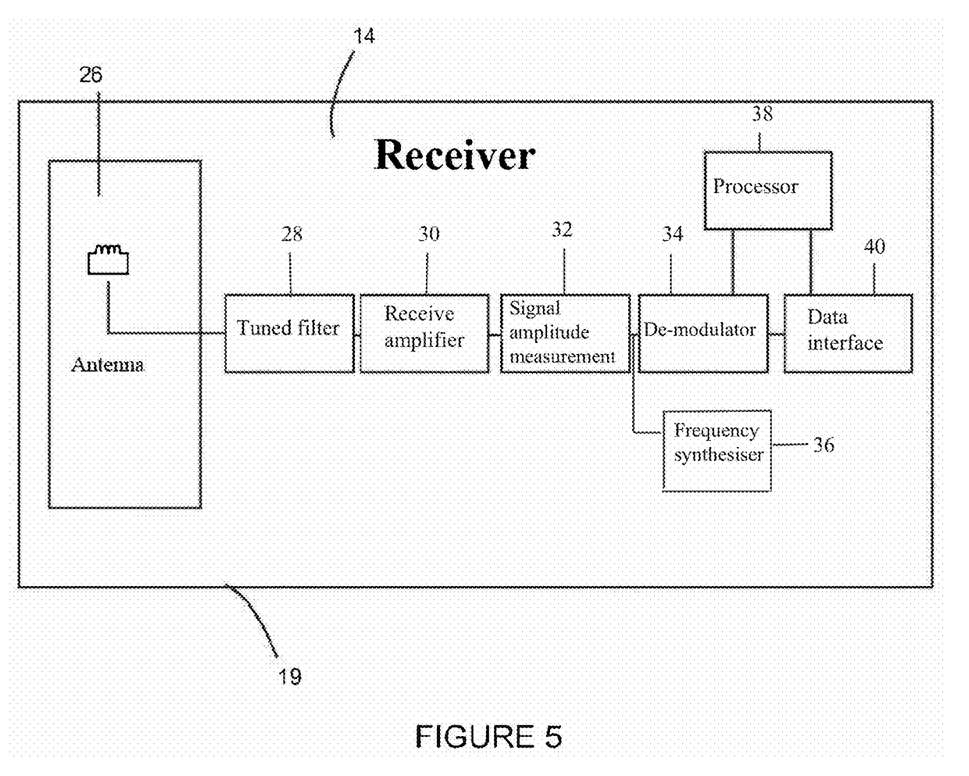
FIG. 5 is a block diagram of an underwater receiver for use in the navigation system of FIG. 1.

FIG. 5 shows an example of a receiver for use in node 12 or the mobile station 14 of FIGS. 1, 2 and 3. This has an electrically insulated magnetic coupled antenna 26 adapted for underwater usage. This antenna 26 is operable to receive magnetic field signals from the transmitter antenna 24. Connected to the antenna 26 is a tuned filter 28 that is in turn connected to a receive amplifier 30. At the output of the amplifier 30 is a signal amplitude measurement module 32 that is coupled to a de-modulator 34 and a frequency synthesiser 36 that provides a Local Oscillator signal for down conversion of the modulated carrier. Connected to the de-modulator 34 is a processor 38 that is in turn connected to a data interface 40. The data interface 40 is provided for transferring data from the receiver to a control or monitoring means, which may be located in the mobile device 10 or at another remote location.

Figure 6:
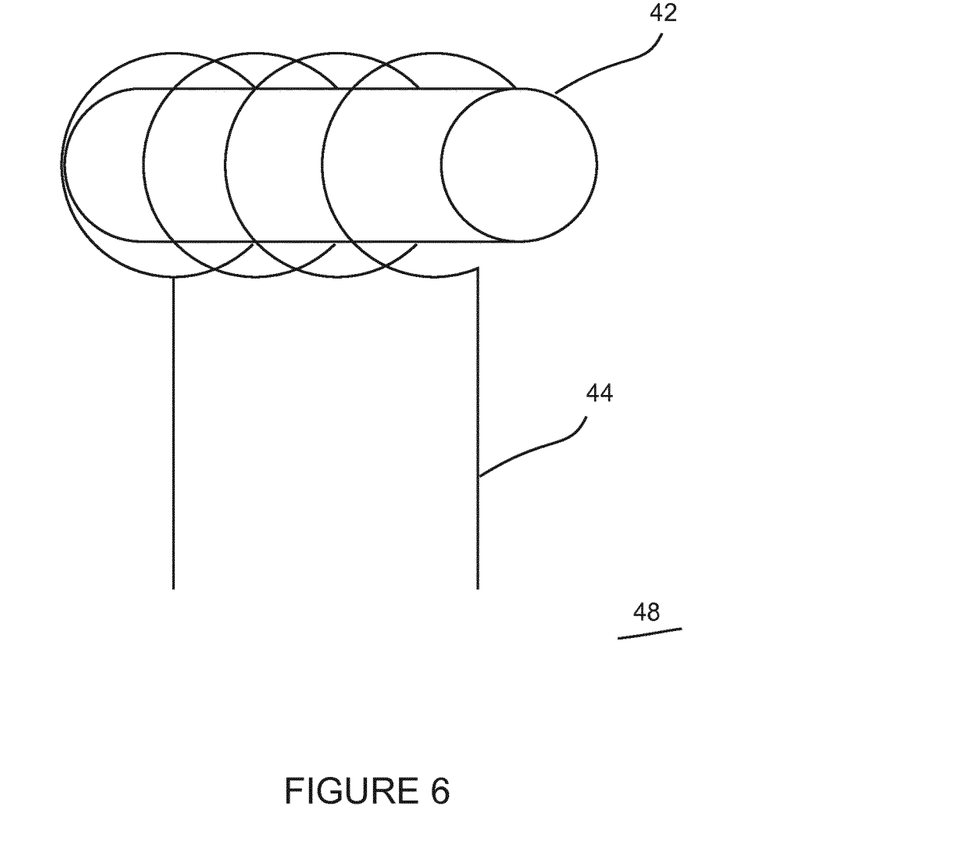
FIG. 6 is a diagrammatic representation of a magnetically coupled solenoid antenna in a waterproof enclosure for use in the transmitter of FIG. 2 and the receiver of FIG. 3.

FIG. 6 shows an example of an electrically insulated, magnetic coupled antenna that can be used in the transmitter 12 and receiver 14 of FIGS. 2 and 3. This has a high permeability ferrite core 42. Wound round the core 42 are multiple loops of an insulated wire 44. The number of turns of the wire 44 and length to diameter ratio of the core 42 can be selected depending on the application. However, for operation at 125 kHz, one thousand turns and a 10:1 length to diameter ratio is suitable. The antenna 24, 26 is connected to the relevant transmitter or receiver and is included in a waterproof housing 48. Within the housing 48 the antenna may be surrounded by air or some other suitable insulator, for example, an impedance matched low conductivity medium such as distilled water.

In use, the receiver 14 is operable to receive signals from the transmitter 12 and use these to determine an indication of its own, relative position. In some circumstances, merely being in range of a transmitter 12 may provide enough information. However, if more detailed information is needed, such as the actual distance from the transmitter 12, the receiver 14 may be operable to use the strength of the received signal. In this case, information would have to be stored on the expected strength of a received signal for a given transmitter power and propagation characteristics as a function of distance. For most applications calculation of the receivers range to the transmitter can be based on a typical physical model of the underwater environment (e.g. expected loss versus range). This model could be improved by measurement of attenuation using a comparison of signal strength between multiple receiver antennas with known relative position within the navigating station.

Figure 7:
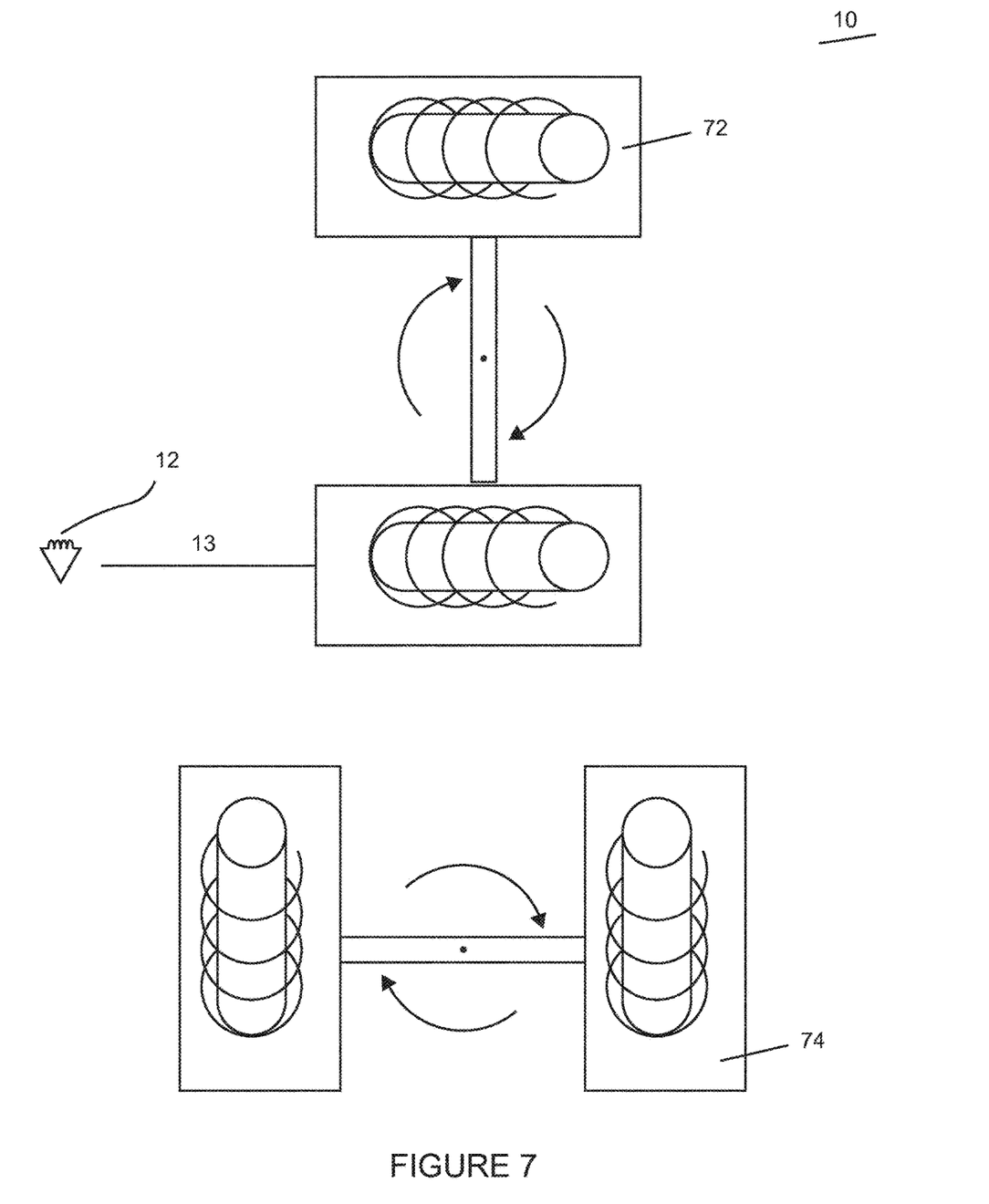
FIG. 7 is a diagrammatic representation of another direction finding technique.
Figure 8:
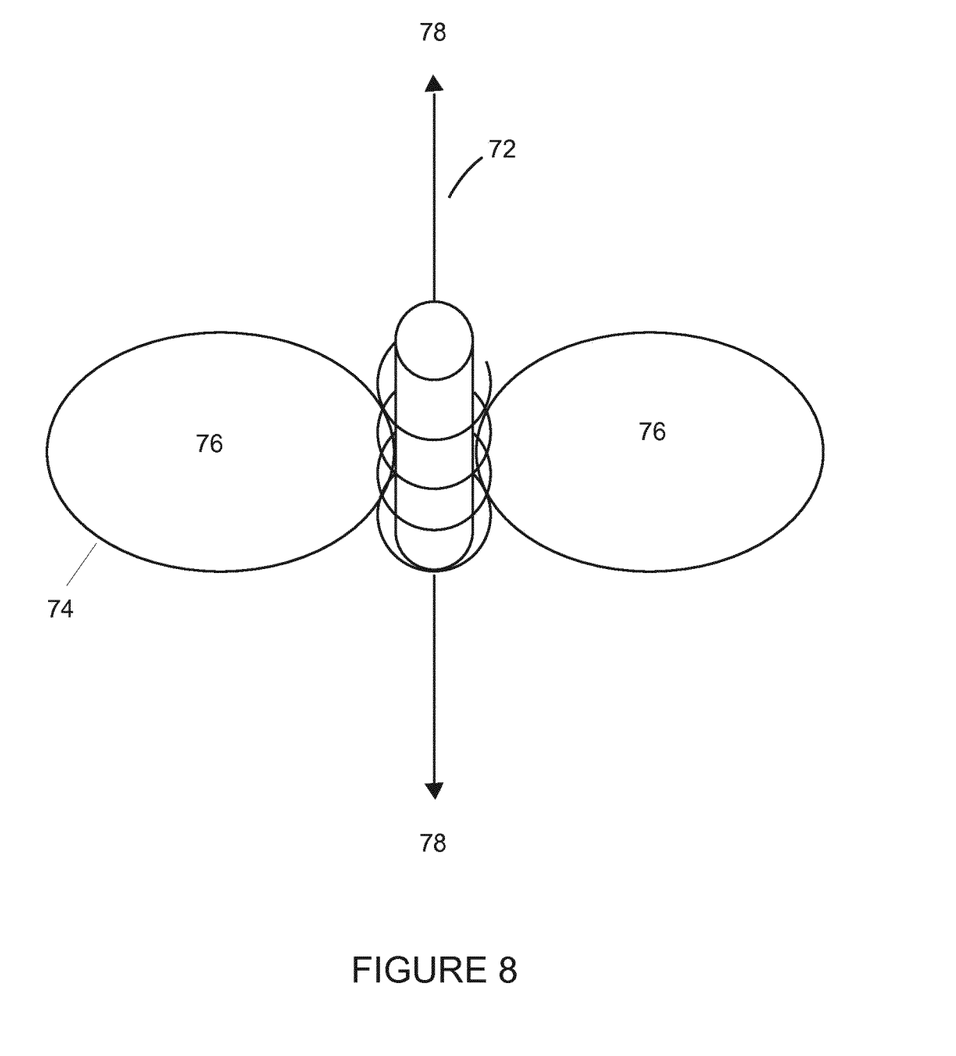
FIG. 8 is a diagrammatic representation of the field pattern produced by a magnetically coupled solenoid antenna.

FIG. 7 shows another navigation system based on a mobile navigation AUV 10 and a transponder node 12. In this case, the navigation AUV 10 includes a highly directional antenna 72, such as a multiple turn solenoid wound around a ferrite rod. This type of antenna 72 generates a radiation pattern with a null point aligned to waves propagating along the axis of the rod as illustrated in FIG. 8. The antenna 72 could be rotated until a minimum is located in the received signal strength. As will be appreciated, a single antenna of this type would result in a 180 degree ambiguity. This can be resolved by comparing the signal strength from a second antenna 74 located at some distance from the first to establish the approximate direction of the loss gradient.

For any of the radio transmitter and receiver navigation systems described above, the navigation node could remain in receive mode until it decodes a valid demand signal transmitted by the navigating station. A n advantage of this is that the nodes would remain covert. Also, this arrangement would reduce power consumption at remote node deployments thereby extending their operational life. Node and navigating stations both require transceivers for a system configuration of this type.

In another embodiment, location accuracy can be improved using data such as the vehicle height A off the seabed 15 using at least one of a pressure sensor and/or a sonar unit housed in AUV 10. The integrated pressure sensor in AUV 10 is used to determine water depth. This information can be used to refine the accuracy of the final resting location of node 12 by cross-referencing with charts and/or specific survey data relating to the seabed topography.

In another embodiment, location accuracy can be improved using data such as the depth of the vehicle from the water surface for example, at least one of a pressure sensor and/or a sonar sensor unit or an ultrasound sensor unit housed in AUV 10. The sensor in AUV 10 can be used to determine water depth. This information can be used to refine the accuracy of the final resting location of node 12 by cross-referencing with charts and/or specific survey data relating to the tide times and predicted tide depths.

In another embodiment, location accuracy can be improved using data such as the gravitational field, with, for example, a pressure sensor or gravitational field sensor housed in AUV 10. The integrated sensor in AUV 10 is used to determine gravitational field at a specific location. This information can be used to refine the accuracy of the final resting location of node 12 by cross-referencing with charts and/or specific survey data relating to gravitational field patterns.

A skilled person will appreciate that variations of the disclosed arrangements are possible without departing from the invention. For example, whilst the systems and methods described are generally applicable to seawater, fresh water and any brackish composition in between, because relatively pure fresh water environments exhibit different electromagnetic propagation properties from saline, seawater, different operating conditions may be needed in different environments. Any optimisation required for specific saline constitutions will be obvious to any practitioner skilled in this area. Accordingly, the above description of the specific embodiment is made by way of example only and not for the purposes of limitation. It will be clear to the skilled person that minor modifications may be made without significant changes to the operation described.

The invention claimed is:

1. An underwater navigation system comprising:
   each node of at least one node comprising a transmitter configured to transmit an electromagnetic signal, wherein the transmitter is configured to transmit location information of the node,
   a mobile navigating station comprising a receiver configured to receive an electromagnetic signal from the transmitter and at least one sensor configured to determine a water depth or a gravitational field at a specific location, wherein the mobile navigating station is configured to obtain the location information of the node, and
   means for refining the location information of the node based on the determined water depth or gravitational field at the specific location.

2. An underwater navigation system as claimed in claim 1, wherein the transmitter and receiver are operable to simultaneously provide a communication links.

3. The underwater navigation system as claimed in claim 1, wherein:
   the node further comprises an accelerometer configured to monitor movement of the node during deployment.

4. An underwater navigation system as claims in claim 3, wherein the monitored movement is used to refine the location information of the node.

5. An underwater navigation system as claimed in claim 3, wherein the accelerometer is configured to determine an orientation of an antenna within the node.

6. An underwater navigation system as claimed in claim 5, wherein the determined orientation of the antenna is used to refine the location information of the node.

7. An underwater navigation system as claimed in claim 1, wherein the location information comprises GPS location information.

8. An underwater navigation system as claimed in claim 1, wherein the at least one sensor of the mobile navigating station comprises one or more of a pressure sensor, a sonar unit, an ultrasound sensor, and a gravitational field sensor.

9. An underwater navigation system as claimed in claim 1, wherein the transmitter includes an electrically insulated magnetic coupled antenna for transmitting an electromagnetic signal.

10. An underwater navigation system as claimed in claim 1, wherein the receiver includes an electrically insulated magnetic coupled antenna for receiving an electromagnetic signal from the transmitter.

11. An underwater navigation system comprising:
    a network of nodes deployed on a seabed, each node of the network of nodes comprising a transmitter configured to transmit an electromagnetic signal, wherein the transmitter is configured to transmit location information of the node,
    a receiver configured to receive a signal from the transmitter, wherein the receiver is configured to obtain the location information of the node, and
    means for refining the location information of the node using information obtained from one or more sensors associated with the node and/or the receiver.

12. The underwater navigation system as claimed in claim 11, wherein the one or more sensors comprises an accelerometer associated with the node.

13. The underwater navigation system as claimed in claim 11, wherein the one or more sensors comprises a pressure sensor, a sonar unit, or an ultrasound sensor associated with the receiver.

14. The underwater navigation system as claimed in claim 11, wherein the one or more sensors comprises a gravitational field sensor.

* * * * *